US008994578B1

(12) United States Patent
Finley et al.

(10) Patent No.: US 8,994,578 B1
(45) Date of Patent: Mar. 31, 2015

(54) ADJUSTING A TARGET VALUE FOR GENERATING A VERTICAL PROFILE VIEW IN A WEATHER RADAR SYSTEM (75) Inventors: Jeffery A. Finley, Cedar Rapids, IA (US); Divya Sishtla Venkata, Cedar Rapids, IA (US); Venkata A. Sishtla, Marion, IA (US); James D. Cahoon, Melbourne, FL (US); Mark B. Godfrey, Melbourne, FL (US); Steven L. Sperling, Cedar Rapids, IA (US); Mark C. Fersdahl, Cedar Rapids, IA (US); Gregory J. Koenigs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 360 days.

(21) Appl. No.: 13/246,706

(22) Filed: Sep. 27, 2011

(51) Int. Cl.
*G01S 13/95* (2006.01)
*G01S 7/24* (2006.01)
*G01S 13/89* (2006.01)

(52) U.S. Cl.
CPC .............. *G01S 13/953* (2013.01); *G01S 7/24* (2013.01); *G01S 13/89* (2013.01)
USPC ........................................ 342/26 B; 342/179

(58) Field of Classification Search
USPC ........................................................ 342/26 B
See application file for complete search history.

(56) References Cited

U.S. PATENT DOCUMENTS

| 4,940,987 | A | * | 7/1990 | Frederick | 342/26 D |
|---|---|---|---|---|---|
| 5,049,886 | A | * | 9/1991 | Seitz et al. | 342/26 B |
| 5,202,690 | A | * | 4/1993 | Frederick | 342/26 B |
| 5,839,080 | A |  | 11/1998 | Muller et al. |  |
| 6,289,277 | B1 |  | 9/2001 | Feyereisen et al. |  |
| 7,242,343 | B1 | * | 7/2007 | Woodell | 342/26 B |
| 7,307,577 | B1 |  | 12/2007 | Kronfeld |  |
| 8,223,062 | B2 | * | 7/2012 | Bunch et al. | 342/26 B |
| 2010/0194628 | A1 | * | 8/2010 | Christianson et al. | 342/26 B |
| 2010/0201565 | A1 | * | 8/2010 | Khatwa | 342/26 B |
| 2011/0187588 | A1 | * | 8/2011 | Khatwa et al. | 342/26 B |
| 2011/0267224 | A1 | * | 11/2011 | Venkatachalam et al. | 342/26 R |

OTHER PUBLICATIONS

Kuntman, D., Satellite Imagery: Predicting aviation weather hazards, ICAO Journal, vol. 55, Mar. 2000, 4 pps.
RDR-4B Honeywell User Manual for Forward Looking Windshear Detection/Weather Radar Syste, Rev. 6, Jul. 2003, 106 pps.

* cited by examiner

*Primary Examiner* — Matthew M Barker
(74) *Attorney, Agent, or Firm* — Angel N. Gerdzhikov; Donna P. Suchy; Daniel M. Barbieri (57) ABSTRACT

A system and method for adjusting a target value for generating a vertical profile view in an aircraft weather radar system is provided. Processing electronics are configured to receive a target value for generating a vertical profile view of weather detected by the radar system. The processing electronics are also configured to adjust the target value to account for the motion of the aircraft and/or the motion of the detected weather.

20 Claims, 6 Drawing Sheets

ADJUSTING A TARGET VALUE FOR GENERATING A VERTICAL PROFILE VIEW IN A WEATHER RADAR SYSTEM

BACKGROUND

The present disclosure relates generally to weather radar systems. More particularly, the present application relates to a weather radar system that displays the presence of weather on a screen.

Conventionally, pilots use weather radar systems to detect and avoid hazardous weather. The radar return signals are processed to provide graphical images to a radar display, for example, a display located in the cockpit of the aircraft. The radar display is typically a color multi-function display (MFD) unit that provides color graphical images to represent the severity and location of weather. Some aircraft weather radar systems also include other hazard detection systems such as a turbulence detection system or a windshear detection system. These types of systems can also provide indications of the presence of turbulence or other hazards.

Many modern weather radar systems utilize a number of radar scanning techniques in order to present different views of detected weather to a display. For example, a plan view may be presented to a cockpit display allowing a pilot to determine the range and location of weather relative to the aircraft. A pilot can use this information to determine a course that avoids the weather. In addition, radar sweeps in the vertical direction can be used to generate a vertical profile view, e.g., a vertical "slice" of the weather on the display. Such profiles allow pilots to determine the height and the severity of the weather. This information may be used by pilots, for example, to determine an appropriate altitude to fly over the weather.

In some weather radar systems, a pilot may be able to select a direction on the displayed plan view from which to generate a vertical profile view. However, as the aircraft and the weather are both moving, the selected direction may soon lose its correlation to the selected area of focus. This can lead to erratic vertical displays and can force a pilot to frequently adjust the selected direction. Applicants have discovered that there may be a need for a weather radar system that automatically adjusts the direction from which the vertical profile is displayed based on the motion of the aircraft and/or the motion of the weather.

SUMMARY

One embodiment of the present disclosure relates to a method of displaying radar return data in a weather radar system of an aircraft. The method includes receiving a target value for generating a vertical profile view of detected weather at a first time. The method also includes calculating an adjusted target value based on the motion of the aircraft between the first time and a later second time.

Another embodiment of the present disclosure relates to a weather radar system for an aircraft. The weather radar system includes a user interface device and processing electronics. The processing electronics are configured to receive a target value for generating a vertical profile view of detected weather from the user interface device. The processing electronics are further configured to calculate an adjusted target value based on the motion of the aircraft.

A further embodiment of the present disclosure relates to one or more computer-readable media having instructions stored therein, the instructions being executable by one or more processors to execute a method. The method includes receiving a target value from a user interface device for generating a vertical profile view of detected weather. The method also includes calculating an adjusted target value based on the motion of the detected weather relative to an aircraft. The method additionally includes generating a vertical profile view based on the adjusted target value and providing the generated vertical profile view to an electronic display.

DETAILED DESCRIPTION

Referring generally to the Figures, systems and methods for adjusting a target value used to generate a vertical profile view in a weather radar system are disclosed. Several views may be available to a user of a weather radar system. For example, horizontal radar scans may be used to generate a plan view for display on an electronic display located in the cockpit of an aircraft. Plan views allows pilots and others to determine the range and location of weather, such as storm clouds. A pilot may use the information from the plan view to alter the course of the aircraft in the horizontal direction, in order to avoid detected weather.

Another type of view that may be provided by the weather radar system is a vertical profile view. Radar scan may also be performed in the vertical direction and used to generate a view that displays a "slice" of the weather in the vertical direction. Typically, vertical profile views convey the range, height, and intensity of the weather. For example, a pilot may use the information from the vertical profile view to fly over the weather.

In weather radar systems that provide both plan and vertical profile views for display, a user may select on the plan view the desired direction from which the vertical profile view will be displayed. However, the desired direction may quickly change, since both the aircraft and the weather are moving. For example, a pilot may request generation of a vertical profile view of a weather cell that has a range of 4 nautical miles (NM) from the aircraft and is 30 degrees off of the nose of the aircraft. However, the generated vertical profile view will soon be out of date due to the motion of the aircraft and the weather. For example, if the aircraft is traveling at 450 knots, the cell will be out of the field of view for the displayed vertical profile view within thirty seconds.

To provide an updated target value for generating vertical profile views, processing electronics are provided. The processing electronics are configured to receive a target value for generating a vertical profile display of weather. A target value may be, for example, a direction, an angle, a point, or any other value that may be used to control the source direction from which the vertical profile view is generated. The processing electronics are further configured to calculate an adjusted target value that accounts for the motion of the aircraft and/or the motion of the weather.

Figure 1:
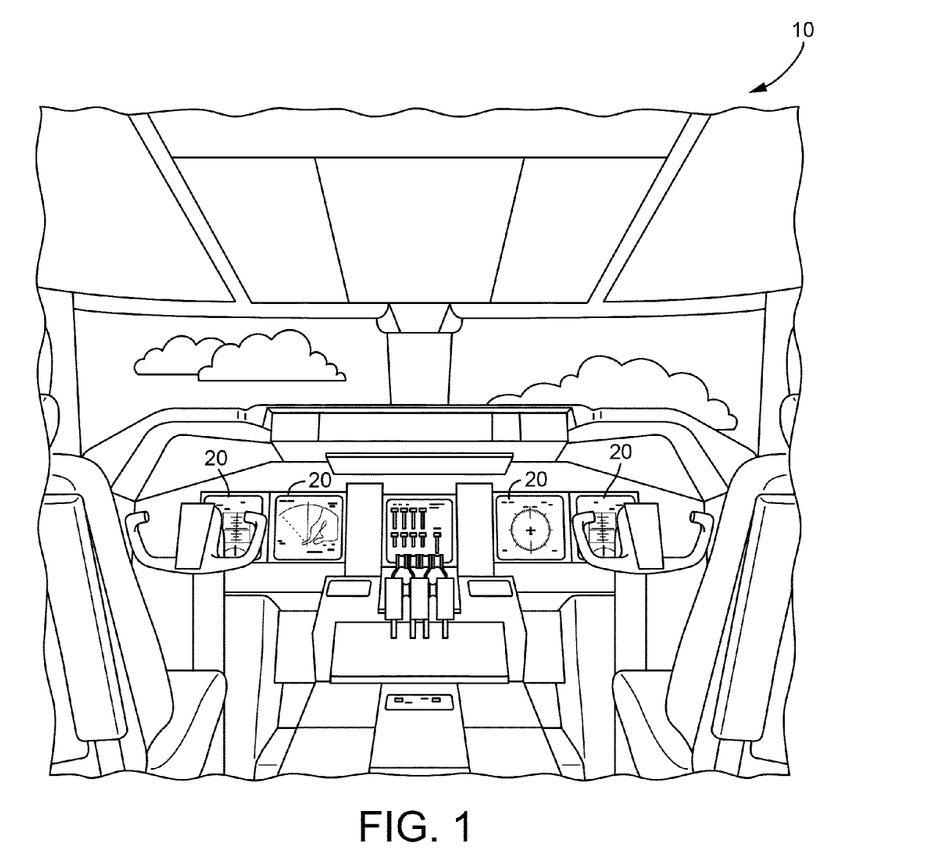
FIG. 1 is an illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, a vertical profile view, or any other view of weather and/or terrain detected by a radar system on the aircraft. The views of weather and/or terrain may include monochrome or color graphical representations of the weather and/or the terrain. Graphical representations of weather or terrain may include an indication of altitude of those objects or the altitude relative to the aircraft. Aircraft control center 10 may further include terrain awareness and warning system (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

Figure 2:
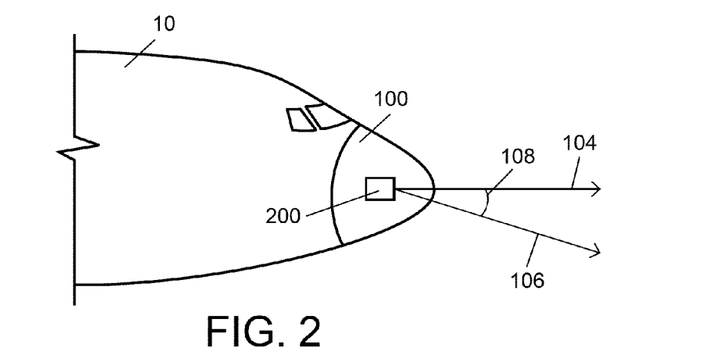
FIG. 2 is an illustration of the nose of an aircraft including a weather radar system, according to an exemplary embodiment.

In FIG. 2, the front of an aircraft is shown with aircraft control center 10 and nose 100, according to an exemplary embodiment. A radar system 200 (e.g., a weather radar system or other radar system) is generally located within nose 100 of the aircraft or within aircraft control center 10 of the aircraft. According to various exemplary embodiments, radar system 200 may be located on the top of the aircraft or on the tail of the aircraft instead. Radar system 200 may include or be coupled to an antenna system. A variety of different antennas or radar systems may be used with the present invention (e.g., a split aperture antenna, a monopulse antenna, a sequential lobbing antenna, etc.).

Radar system 200 generally works by sweeping a radar beam horizontally back and forth across the sky. Some radar systems will conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display, such as a flight display 20 in aircraft control center 10. Returns can also be processed to, for example, distinguish between terrain and weather, to determine the height of terrain, or to determine the height of weather. In one embodiment, radar system 200 may be a WXR-2100 MultiScan™ radar system or similar system manufactured by Rockwell Collins. According to other embodiments, radar system 200 may be an RDR-4000 system, an IntuVue™ 3-D radar system, or similar system manufactured by Honeywell International, Inc.

Radar system 200 may also sweep a radar beam vertically back and forth. Results from different the different vertical tilt angles may be analyzed to determine the characteristics of weather. For example, the altitude, range, and vertical height of the weather may be determined using the vertical scan results. These results may be used to form a an image for display on an electronic display (e.g., flight display 20, etc.). For example, a vertical profile view of the weather may be generated. Such a profile may be used by a pilot to determine height, range, and other relevant information that can be utilized by the pilot to change the course of the aircraft to avoid the detected weather. In some embodiments, radar system 200 may construct a vertical weather profile without scanning vertically back and forth. For example, radar system 200 may scan horizontally at various tilts and then store horizontal data in a memory. Vertical profiles may be generated from interpolation of data from the horizontal scans.

Figure 3A:
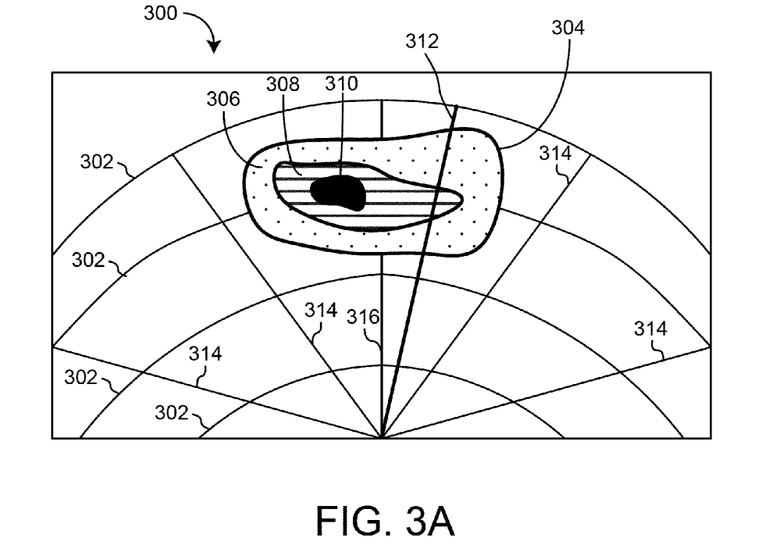
FIG. 3A is an illustration of a plan view of weather radar returns, according to an exemplary embodiment.

Referring now to FIG. 3A, an illustration of a plan view of weather radar returns is shown, according to exemplary embodiments. Plan view 300 may be generated by processing the weather radar returns and then presenting the returns on an electronic display (e.g., flight display 20, etc.) for review by a user.

Several radar return measurements are conveyed via plan view 300. First, detected weather 304 is displayed based on the processed radar returns. In some embodiments, the severity of detected weather 304 may also be displayed. In such a case, various color patterns or other indicia may be used to denote those regions of detected weather 304 that are more severe than the others. For example, a color rating system using red to denote the highest severity, yellow to denote intermediate severity, and green to denote the lowest severity may be employed by plan view 300. In some embodiments, the severity rating may be an average of severities for a particular slice of weather. As shown, detected weather 304 includes a low severity region 306, an intermediate severity region 308, and a high severity region 310.

Plan view 300 may also include heading line 316, which indicates the current direction in which the aircraft is traveling. Heading line 316 allows a pilot a point of reference from which he or she may determine the bearing to detected weather. For example, the location of high severity region 310 of detected weather 304 may be represented as being between −5 and −15 degrees, relative to heading line 316.

In addition to bearing, the range of detected weather 304 may also be displayed in plan view 300. In general, range refers to the distance between the aircraft and another point in space, such as the location of weather. Plan view 300 may include, for example, range lines 302 which represent the distance from the aircraft to a particular range line 302 (e.g., measured in nautical miles, another measure of distance, etc.). This allows the pilot or other user of plan view 300 to determine the amount of time before the aircraft encounters the detected weather or other object. For example, range lines 302 may define a total range of 80 NM, with intervals of 20 NM between range lines 302. Range lines 302 may be spaced to denote the same distance between lines or unevenly spaced. In some embodiments, different lengths of measure may be used to generate plan view 300 based on input from a user interface device. For example, a pilot or other user may request that plan view 300 displays a maximum range of 160 NM with 40 NM intervals between range lines 302.

The range and bearing information provided by plan view 300 can be used by a pilot to determine an appropriate course of action. For example, a pilot viewing plan view 300 may choose to alter the heading of the plan, in order to avoid detected weather 304. In another example, the pilot viewing plan view 300 may choose to direct the plane towards a less severe region of detected weather 304. In a further example, the pilot may decide to change the altitude of the aircraft accordingly, for example, by flying over detected weather 304.

Figure 3B:
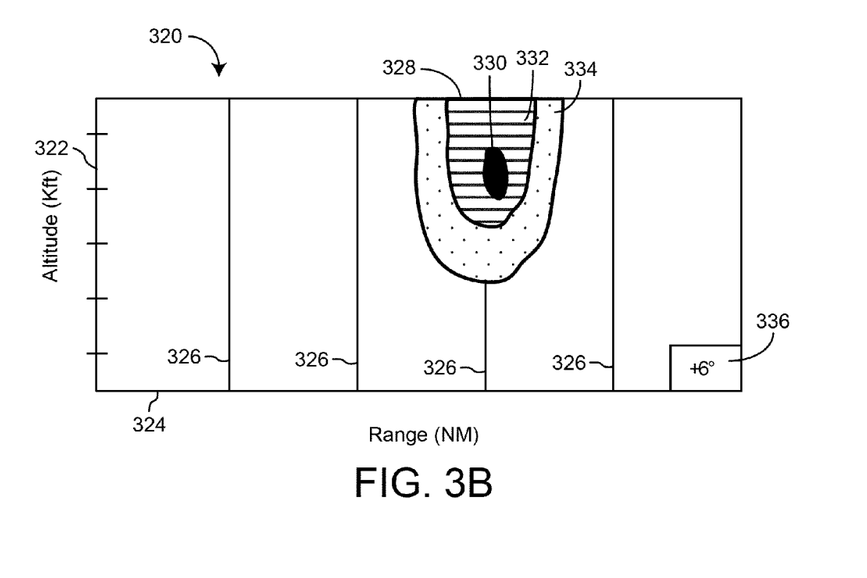
FIG. 3B is an illustration of a vertical profile view generated using the target value shown in FIG. 3A, according to an exemplary embodiment.

Referring now to FIGS. 3A and 3B, a vertical profile view 320 may also be generated using weather radar returns and displayed on an electronic display. Plan view 300 and vertical profile view 320 may be presented on the same electronic display or on separate electronic displays, according to various embodiments. In addition, plan view 300 and vertical profile view 320 may be displayed simultaneously or in an alternating manner (e.g., only one view is presented at a time on a single display).

In one embodiment, a pilot or other user of plan view 300 may select a target value used to generate vertical profile view 320. In general, a target value may be a direction or a location in space from which a vertical profile view is generated. For example, the target value may be a latitude and longitude, a coordinate point, or a set of coordinates in any form of coordinate system (e.g., Cartesian, cylindrical, spherical, etc.). In another example, the target value may be a bearing, angle, or relative direction (e.g., an angle measured from heading line 316, the direction to True North, or any other reference direction, etc.). In a further example, the target value may include both a range and a bearing.

In some embodiments, an indication of the target value may be provided as part of plan view 300. For example, plan view 300 may include target direction line 312 that indicates the current direction from which vertical profile view 320 is generated. A pilot or other user may utilize a user interface device (e.g., a touchscreen display, a pointing device, a mouse, a keyboard, an adjustment knob, a microphone, or any other electronic device configured to receiving input from a user) to define the target value, to select an area of focus for vertical profile view 320.

Vertical profile view 320 may include any number of measurements or data associated with the weather radar returns. For example, vertical profile view 320 may display vertical weather profile 328, which represents the vertical section of weather 304 at the azimuth angle defined by target direction line 312 in relation to heading line 316. Similar to plan view 300, vertical weather profile 328 may include indicia used to represent severity at various areas of vertical weather profile 328. For example, a color rating system using red to denote the highest severity, yellow to denote intermediate severity, and green to denote the lowest severity may also be utilized in vertical profile view 320. As shown, vertical weather profile 328 includes a low severity region 334, an intermediate severity region 332, and a high severity region 330.

One measurement that may be presented as part of vertical profile view 320 is altitude 322. Altitude 322 provides a measure of the height of detected weather relative to the ground (e.g., measured in kilo-feet, meters, etc.). Altitude 322 allows a pilot or other user to determine vertical distances related to the weather. For example, altitude 322 may be used to determine the distance from the ground to the weather, the vertical span of the weather, or the overall height of the weather. A pilot may use this information, for example, to determine an appropriate altitude at which to approach the weather.

Another measurement that may be presented on vertical profile view 320 is range 324. Range 324 allows the pilot or other user to determine the distance between the aircraft and the weather. In some cases, vertical profile view 320 may also include range lines 326 to indicate various distances measured in nautical miles (NM) or a similar measure of distance. Range lines 326 may correspond to range lines 302 in plan view 300 and represent the same distances, or may be independent from that of range lines 302.

Vertical profile view 320 may also include a measurement or other indicia to indicate the direction or location from which the vertical profile view was generated. For example, vertical profile view 320 may include indicia 336 that presents the azimuth angle to the target, i.e., the angle between heading line 316 and target direction line 312. In other embodiments, indicia 336 may include a coordinate, set of coordinates, or any other indicia that corresponds to the direction from which vertical profile view 320 is generated.

Figure 4A:
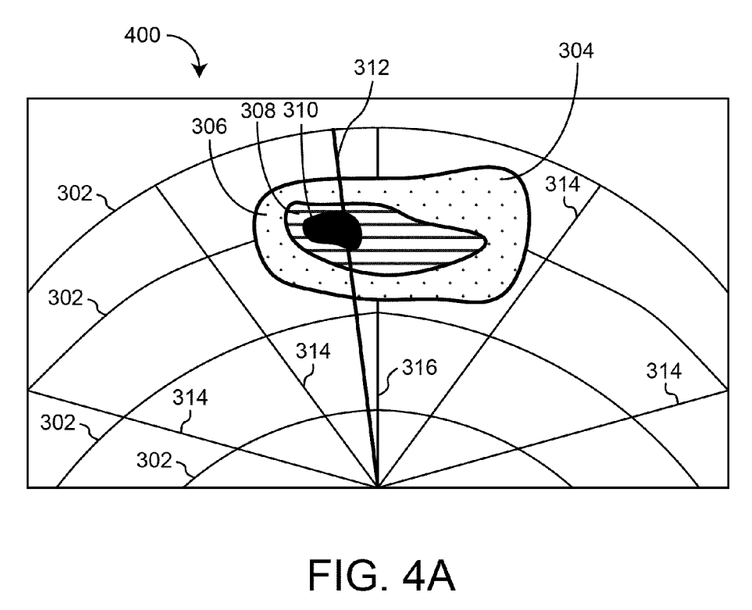
FIG. 4A is an illustration of the plan view display of FIG. 3A showing a different target value, according to an exemplary embodiment.
Figure 4B:
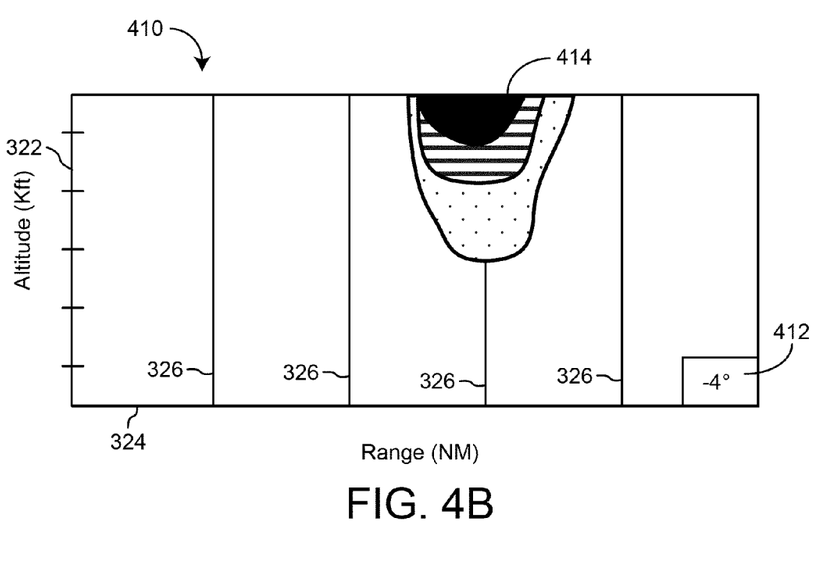
FIG. 4B is an illustration of the vertical profile view generated using the target value shown in FIG. 4A, according to an exemplary embodiment.

Referring now to FIGS. 4A-4B, plan view 400 and vertical profile view 410 are shown, according to exemplary embodiments. Plan view 400 and vertical profile view 410 correspond to plan view 300 and vertical profile view 320 shown in FIGS. 3A-3B, respectively, after an amount of time has elapsed. As shown, detected weather 304 has substantially the same shape and position in plan view 400 as in plan view 300. This may be the case where a small amount of time has elapsed and the aircraft has not altered its heading. However, the size, shape, and location of detected weather 304 on plan view 400 may also change over longer amounts of time, since both the aircraft and detected weather 304 are both moving. Other potential causes of changes to the display of detected weather 304 include a change in the heading of the aircraft and a change in the heading of detected weather 304.

As shown, target direction line 312 has been moved from a first position in plan view 300 to the position shown in plan view 400. For example, a pilot may use a dial to adjust target direction line 312 as desired, in order to update vertical profile view 410. This allows the pilot to identify a different area of detected weather 304 from which vertical profile information is desired.

Figure 5A:
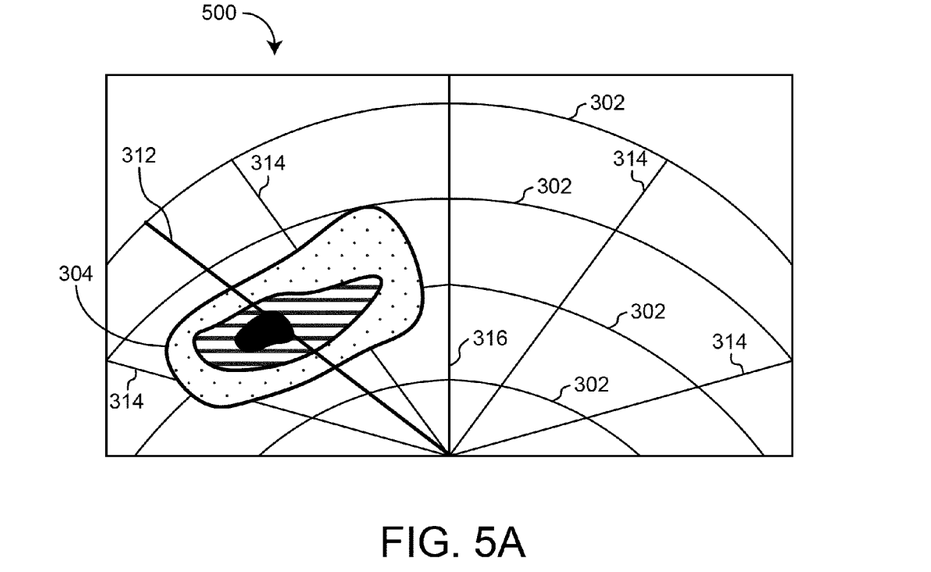
FIG. 5A is an illustration of a plan view with an adjusted target value, according to an exemplary embodiment.
Figure 5B:
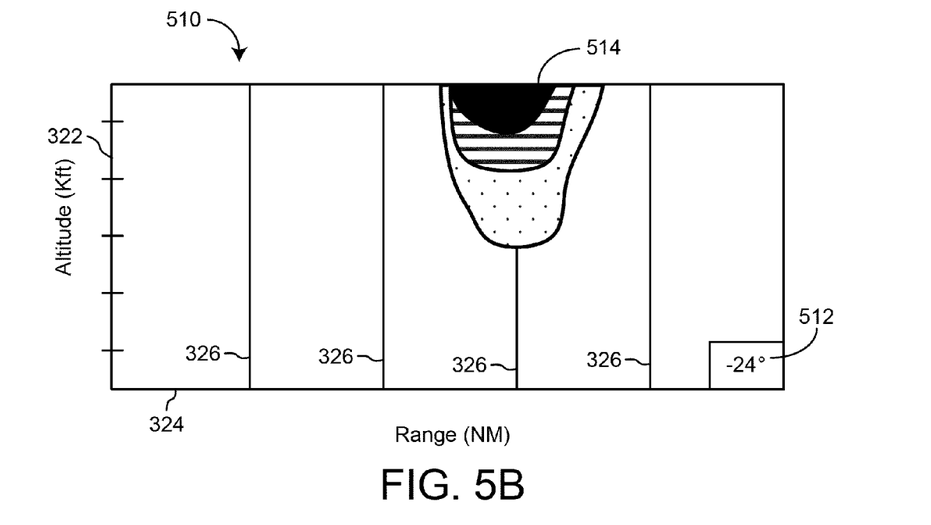
FIG. 5B is an illustration of a vertical profile view generated using the target value shown in FIG. 5A, according to an exemplary embodiment.

Referring now to FIGS. 5A-5B, plan view 500 and vertical profile view 510 are shown, according to exemplary embodiments. As shown, detected weather 304 has shifted in plan view 500 from that of plan view 400 in FIG. 4A. For example, this shifting may be due to the motion of the aircraft, the motion of detected weather 304, or a combination of the two.

In some embodiments, the processing electronics that generate vertical profile view 510 are also configured to adjust the target value, in order to account for the motion of the aircraft and/or the motion of detected weather 304. As shown in FIG. 5B, vertical weather profile 514 is from the same general area of focus for detected weather 304 that is used to generate vertical weather profile 414 in FIG. 4B. However, due to the motion of the aircraft and/or detected weather 304, the target value used to generate vertical weather profile view 510 has been adjusted from that of vertical weather profile view 410.

In some embodiments, the adjustment to the target value are made without further user interaction, after a user specifies a target value. For example, a pilot may specify target direction line 312 on plan view 400 in FIG. 4A. In response, the processing electronics used to generate vertical profile view displays 410 and 510 may automatically adjust target direction line 312, accordingly.

In one embodiment, the automatic adjustment to the target value may be controlled by one or more parameters. For example, the processing electronics may not perform adjustments to the target value unless a command is received from a user interface device to perform automatic adjustments. In some cases, a default behavior may also be defined. For example, the user may specify that automatic adjustments are to be performed by the processing electronics unless an override command is received. If automatic adjustment of the target value is user-selectable, an indication 512 may also be displayed to alert the user to the current behavior.

One or more indications of the adjustment of the target value may also be provided to a user interface device. For example, target direction line 312 may change its displayed position as the target value is adjusted. In another example, indicia 512 may also change its displayed azimuth angle as the target value is adjusted. Any number of different types of indications may be provided. If visual indicia is provided on an electronic display, an icon, a graphic, a coloration, or any other type of indicator may be used to denote the current target value. In other embodiments, an indication may include an audible tone provided by a speaker, lighting a lamp, turning off a lamp, and other forms of conveying information to a user via a user interface device.

Figure 6:
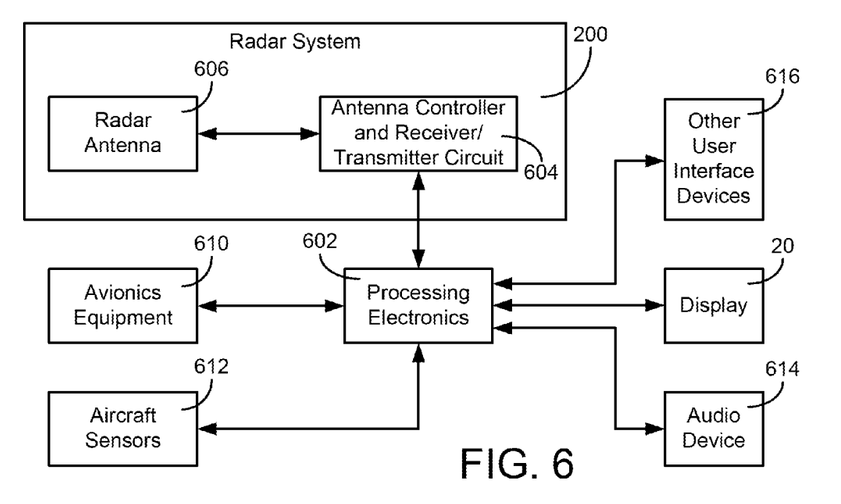
FIG. 6 is a general schematic block diagram of the processing electronics of the aircraft radar system of FIG. 2, according to an exemplary embodiment.

Referring now to FIG. 6, a block diagram of radar system 200 is shown, according to an exemplary embodiment. Radar system 200 is installed on the aircraft (e.g., in nose 100 of the aircraft or another location) and may be used by the various detection systems of the aircraft to detect hazardous conditions. For example, radar system 200 may be used by a weather detection system to detect the presence of weather, a PWS system to detect a windshear condition, or by other radar detection systems of the aircraft.

Radar system 200 is shown to include a radar antenna 606 connected (e.g., directly, indirectly) to an antenna controller and receiver/transmitter circuit 604. Antenna controller and receiver/transmitter circuit 604 may include any number of mechanical or electrical circuitry components or modules for steering a radar beam generated by radar antenna 606. For example, circuit 604 may be configured to mechanically tilt radar antenna 606 in a first direction while mechanically rotating radar antenna 606 in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent apertures in radar antenna 606, etc.). Circuit 604 may be configured to conduct the actual signal generation that results in a radar beam being provided from radar antenna 606 and to conduct the reception of returns received at radar antenna 606.

Radar return data is provided from circuit 604 to processing electronics 602 for data processing. For example, processing electronics 602 may use the radar return data to determine if a hazardous condition has been detected or is likely to exist. Processing electronics 602 may also be configured to provide control signals or control logic to circuit 604. For example, depending on various inputs, processing electronics 602 may be configured to cause circuit 604 to change behavior or radar beam patterns. In other words, processing electronics 602 may include the processing logic for operating radar system 200.

Processing electronics 602 are further shown in communication with aircraft sensors 612. In general, sensors 612 may be any number of sensors that measure aircraft parameters related to the state of the aircraft. For example, sensors 612 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), or any other aircraft-mounted sensors that may be used to provide data to processing electronics 602. It should be appreciated that sensors 612 (or any other component shown connected to processing electronics 602) may be indirectly or directly connected to the processing electronics 602. For example, processing electronics 602 may receive a temperature reading from a temperature sensor via a direct connection and a throttle position received indirectly from a position sensor via an engine controller.

Processing electronics 602 are further shown in communication with avionics equipment 610. In general, avionics equipment 610 may include other electronic control systems in the aircraft. For example, avionics equipment 610 may include a flight management system, a navigation system, a backup navigation system, or another aircraft system configured to provide inputs to processing electronics 602. For example, avionics equipment 610 may include the landing gear system of the aircraft and provide information such as whether or not the landing gear is deployed, a weight on wheels determination, or other parameters to processing electronics 602. In another example, avionics equipment 610 may provide controls inputs, such as a desired throttle or power level to processing electronics 602.

Processing electronics 602 are additionally shown in communication with display 20, audio device 614, and other user interface devices 616 (e.g., an electronic device that receives input from a user or conveys information to a user). For example, processing electronics 602 may provide information about detected weather or other radar-related information to display 20. In some cases, processing electronics 602 may also receive input from display 20, audio device 614, or other user interface devices 616. For example, processing electronics 602 may receive a request for a different radar view or an updated trajectory via display 20 or via a dial in other user interface devices 616.

Processing electronics 602 may also receive a target value from display 20, audio device 614, or other user interface devices 616. Processing electronics 602 uses the received target value to generate a vertical plan view for display on display 20. In response, processing electronics 602 may utilize the target value and circuit 604 to direct the direction of the radar sweeps performed by antenna 606, according to some embodiments. Processing electronics 602 may receive the data corresponding to the radar returns and use them to generate the vertical profile view. In another embodiment, processing electronics 602 may use the target value to determine how radar return data is used to generate the vertical profile view. Processing electronics 602 may also provide the generated vertical profile view to a display (e.g., display 20, a remote display, etc.).

In some embodiments, processing electronics 602 is configured to automatically adjust the target value used to generate the vertical profile view. The adjustment by processing electronics 602 may be made to account for the motion of the aircraft and/or the motion of detected weather. If the adjustment functionality of processing electronics 602 is controlled by one or more parameters, processing electronics 602 may also determine whether or not an adjustment to the target value should be made.

The motion of the aircraft may be determined by processing electronics 602 based on data received from aircraft sensors 612 (e.g., GPS data, compass data, etc.), avionics equipment 610 (e.g., throttle information, velocity information, etc.), or from radar returns relative to a known location (e.g., a landmark, a reference location, etc.). The data may be indirectly or directly indicative of the speed and direction of the aircraft. For example, processing electronics 602 may directly receive speed and direction data from avionics equipment 610. In another example, processing electronics may determine the speed and direction of the aircraft by comparing GPS locations.

Processing electronics 602 may determine the motion of detected weather using data received from aircraft sensors 612 (e.g., GPS data, compass data, etc.), avionics equipment 610 (e.g., throttle information, velocity information, etc.), or from radar returns. For example, processing electronics 602 may maintain a history of detected weather and compare the data over time to determine the speed, direction, and range of the detected weather. In another example, processing electronics 602 may estimate the speed and direction of the weather using data received from a radar system located remotely from the aircraft. In some embodiments, processing electronics 602 may also identify and track a centroid of the weather, in order to determine the motion of the detected weather.

Figure 7:
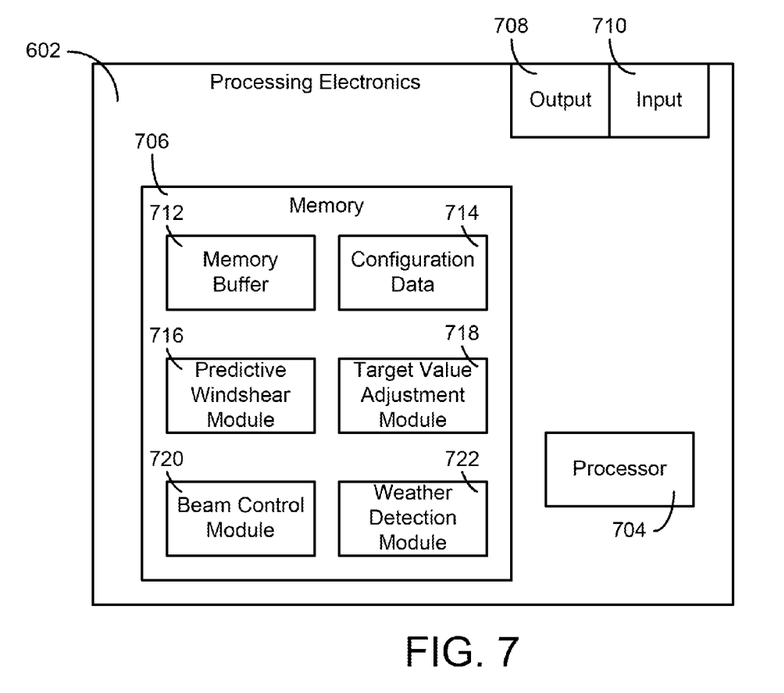
FIG. 7 is a general schematic block diagram of the processing electronics of FIG. 6, according to an exemplary embodiment.

Referring now to FIG. 7, a detailed block diagram of processing electronics 602 of FIG. 6 is shown, according to an exemplary embodiment. Processing electronics 602 includes a memory 706 and processor 704. Processor 704 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 704 is configured to execute computer code stored in memory 706 to complete and facilitate the activities described herein. Memory 706 can be any volatile or non-volatile computer-readable medium capable of storing data or computer code relating to the activities described herein. For example, memory 706 is shown to include modules 716-722 which are computer code modules (e.g., executable code, object code, source code, script code, machine code, etc.) configured for execution by processor 704. When executed by processor 704, processing electronics 602 is configured to complete the activities described herein. Processing electronics includes hardware circuitry for supporting the execution of the computer code of modules 716-722. For example, processing electronics 602 includes hardware interfaces (e.g., output 708) for communicating control signals (e.g., analog, digital) from processing electronics 602 to circuit 604 and to provide signals to other devices such as display 20, audio devices 614, and other user interface devices 616. Processing electronics 602 may also include an input 710 for receiving, for example, radar return data from circuit 604, feedback signals from circuit 604, or for receiving data from user interface devices (e.g., display 20, other user interface devices 616, etc.) or other systems (e.g., aircraft sensors 612, avionics equipment 610, etc.).

Memory 706 includes a memory buffer 712 for receiving and storing radar return data and other data. For example, a forward looking terrain alerting algorithm, an object detection module, predictive windshear module 716, weather detection module 722, or another process that utilizes radar return data may access buffer 712. The radar return data stored in memory 706 may be stored according to a variety of schemes or formats. For example, the radar return data may be stored in an x,y or x,y,z format, a heading-up format, a north-up format, a latitude-longitude format, or any other suitable format for storing spatial-relative information. Memory buffer 712 may also store airplane parameters related to the operational state of the aircraft received from aircraft sensors 612 or avionics equipment 610.

Memory 706 further includes configuration data 714. Configuration data 714 may include data relating to radar system 200 that is used to affect the operation of radar system 200. For example, configuration data 714 may include beam pattern data which may be data that beam control module 720 can interpret to determine how to command circuit 604 to sweep a radar beam. For example, configuration data 714 may include information regarding maximum and minimum azimuth angles of horizontal radar beam sweeps, timing information, speed of movement information, and the like. Configuration data 714 may also include a target value received from a user interface device via input 710. In one embodiment, the target value may be used by processing electronics 602 to determine the azimuth angles at which to conduct vertical radar beam sweeps, in order to generate a vertical profile view. In another embodiment, the target value may be used to select and process radar return data stored in memory buffer 712, in order to generate a vertical profile view that corresponds with the target value.

Configuration data 714 may also include other user or computer defined parameters that alter the functionality of processing electronics 602. For example, configuration data 714 may include a parameter that defines how information from radar system 200 is presented via display 20, audio device 614, and other user interface devices 616. In another example, configuration data 714 may include a parameter that is used to determine whether or not processing electronics 602 is to automatically adjust the target value. Configuration data 714 may further include one or more parameters that controls how target values are defined. Examples of parameters that control how target values are defined include parameters that control whether a target value is represented as an angle or as a coordinate, which coordinate system is used (e.g., 2-dimensional, 3-dimensional, Cartesian, spherical, etc.), the reference direction with respect to which the angle is measured (e.g., True North, the heading of the aircraft, etc.), whether the range to the target weather is used, whether the target value is represented as a latitude and longitude, and other parameters that control how target values are defined and used.

Memory 706 is also shown to include weather detection module 722 which includes logic for using radar returns in memory buffer 712 to conduct one or more determinations relating to weather. For example, weather detection module 722 may be configured to determine a gain level or other display setting for display of the radar returns on a weather radar display (e.g., on display 20). Weather detection module 722 may further be configured to distinguish terrain returns from weather returns. Weather detection module 722 may also determine when weather is hazardous, determine characteristics of detected weather, or conduct any other processing steps (e.g., filtering) relative to the radar return data for providing a display or warning in the aircraft.

In some embodiments, weather detection module 722 may also track the centroids or outlines of detected weather. The centroid or weather outline information may be used by weather detection module 722 to determine a characteristic of detected weather. For example, U.S. Pat. No. 7,307,577 to Kronfeld et al. discloses a method of using weather centroid data to determine the maximum height of a detected weather, the entirety of which is hereby incorporated by reference.

Weather detection module 722 uses the radar returns in memory buffer 712 to generate one or more views of weather. Weather detection module 722 also provides generated views to one or more electronic displays, such as display 20. For example, radar returns in memory buffer 712 may be used to generate a plan view of weather. In another example, radar returns in memory 712 from a radar sweep may be used to generate a vertical profile view for display 20. Any number of different views may be generated by weather detection module 722 and provided to display 20.

Memory 706 is further shown to include beam control module 720. Beam control module 720 may be an algorithm for commanding circuit 604 to sweep a radar beam. Beam control module 720 may be used, for example, to send one or more analog or digital control signals to circuit 604. The control signals may be, for example, an instruction to move the antenna mechanically, an instruction to conduct an electronic beam sweep in a certain way, an instruction to move the radar beam to the left by five degrees, etc. Beam control module 720 may be configured to control timing of the beam sweeps or movements relative to aircraft speed, flight path information, transmission or reception characteristics from radar system 200 or otherwise. Beam control module 720 may receive data from configuration data 714 for configuring the movement of the radar beam.

In some embodiments, beam control module 720 may also receive a target value for directing radar sweeps. Beam control module 720 uses the target value to control the direction at which radar sweeps are made. For example, a target value from a user interface device (e.g., display 20, other user interface devices 616, etc.) may be used by beam control module 720 to direct radar antenna 606 in a specified direction. Beam control module 720 may also use adjusted target values (e.g., from target value adjustment module 718) to reposition the direction of radar antenna 606.

Memory 706 further includes a predictive windshear module 716 which includes logic for using radar returns in memory buffer 712 to detect the presence or absence of microbursts or windshear. Predictive windshear module 716 may include or be coupled to a weather database or other memory including weather data such as microburst downflow models. Predictive windshear module 716 may be configured to use radar return information or information derived by radar return information with weather data stored in a weather database or other memory.

Predictive windshear module 716 may also be configured to automatically activate radar system 200, based on the operational state determined by aircraft status module 718 (e.g., during takeoff, during landing, etc.). For example, predictive windshear module 716 may automatically activate radar antenna 606 during a landing when the aircraft reaches a given altitude threshold. In another example, predictive windshear module 716 may automatically activate radar system 200 during takeoff, provided certain aircraft conditions or qualifiers are met. For example, predictive windshear module 716 may determine that the aircraft is about to take off based on a weight on wheels determination, the engine throttle, the velocity of the aircraft, or any other aircraft parameter associated with takeoffs.

Memory 706 may also include target value adjustment module 718. Target value adjustment module 718 is configured to calculate an adjusted target value that accounts for the motion of the aircraft and/or the motion of detected weather. For example, when weather detection module 722 processes radar returns to generate a view for display 20, it may also command target value adjustment module 718 to adjust the target. In some embodiments, target value adjustment module 718 may provide the adjusted target value to beam control module 720, in order to control the direction at which radar sweeps are made by radar antenna 606. In other embodiments, target value adjustment module 718 may provide the adjusted target value to weather detection module 722. Weather detection module 722 may use the target value to select corresponding radar return data from memory buffer 712, to generate a vertical profile view.

In some embodiments, target value adjustment module 718 may determine the motion of the aircraft, in order to adjust the target value. For example, target value adjustment module 718 may base the adjustment on data stored in memory buffer 712 received from other electronic devices in the aircraft (e.g., aircraft sensors 612, avionics equipment 610, radar system 200, etc.). In some cases, target value adjustment module 712 may utilize a history of values to determine the motion of the aircraft. For example, target value adjustment module 718 may determine the speed and direction of the aircraft by analyzing a history of location data.

Target value adjustment module 718 may also determine the motion of detected weather. For example, radar return data stored in memory buffer 712 may be analyzed by target value adjustment module 718 to determine the location, speed, or direction of detected weather. Target value adjustment module 718 may also use centroid or weather outline tracking information received from weather detection module 722 to adjust the target value.

Target value adjustment module 718 may also use a parameter in configuration data 714 to determine whether or not to adjust the target value. In such a case, target value adjustment module 718 may only adjust a target parameter if an instruction to do so is received from a user interface device (e.g., display 20, other user interface devices 616, etc.). For example, a pilot may input a target value via a user interface device to request that a particular vertical profile view be generated. The pilot may also select an option to automatically adjust the target value. Target value adjustment module 718 may use this selection to begin adjusting the target value.

Figure 8:
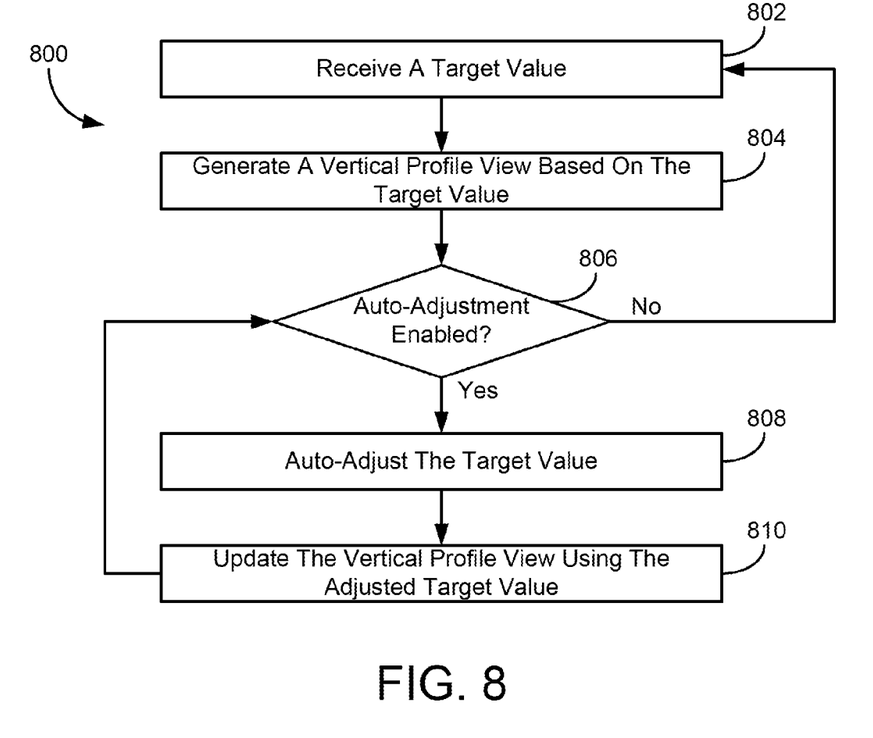
FIG. 8 is a flow chart of a process for adjusting a target value in an aircraft radar system, according to an exemplary embodiment.

Referring now to FIG. 8, a flowchart of a process 800 for adjusting a target value in an aircraft radar system is shown, according to an exemplary embodiment. Process 800 may be implemented, for example, in a weather radar system and used to generate vertical profile views of detected weather.

Process 800 is shown to include receiving a target value (step 802). In general, the target value may be a location and/or direction from which to generate a vertical profile view. The target value may be, for example, a coordinate, a set of coordinates, a region, a direction, a range, any combination thereof, or any other form of data that may be used to indicate a desired direction from which to generate a vertical profile view. In one example, the target value may correspond to an azimuth angle measured relative to the heading of the aircraft and/or a range to detected weather.

The target value may be received from an electronic user interface device (e.g., a pointing device, a touchscreen display, a dial, a microphone, a keypad, etc.) by processing electronics. In one example, the target value may correspond to an azimuth angle relative to the heading of the aircraft as part of a plan view. In such a case, a pilot may utilize a dial (i.e., a user interface device) to input the desired target value. In another example, a pilot may utilize a touch-screen display to select a portion of a plan view (e.g., a point, a region, a line, a line segment, etc.) from which to generate the vertical profile view.

Process 800 is also shown to include generating a vertical profile view based on the target value (step 804). For example, the processing electronics that receive the target value may use the target value to initiate a number of actions. In some embodiments, the target value may be used to change the position of the antenna of the aircraft radar system. For example, a target value may correspond to a desired direction at which the radar system is to perform a vertical sweep. In other embodiments, the target value may be used to determine what radar return data is to be used to generate the vertical profile view. The radar returns may, for example, correspond to a larger area scanned by the radar system than is requested using the target value. In such a case, the target value may be used to limit what radar return data is used to generate the vertical profile view.

The radar return information corresponding to the target value can be utilized by the processing electronics to generate a vertical profile view. The processing electronics may also provide the generated vertical profile view to one or more display devices. For example, the processing electronics may provide the generated vertical profile view to a display located in the cockpit of the aircraft or to a display located remotely from the aircraft.

Process 800 is also shown to include determining if the target value auto-adjustment feature is enabled (step 806). The determination at step 806 may be based on one or more parameters or configurations stored in memory. For example, a pilot may activate the auto-adjustment feature by using a user interface device. In another example, the auto-adjustment feature may be enabled based on status information from the systems of the aircraft (e.g., the aircraft is in flight, the aircraft is taking off, the aircraft is landing, etc.). In yet another example, the auto-adjustment feature may be enabled based on the radar returns (e.g., auto-adjustment is enabled if the detected weather exhibits certain characteristics or behaviors). In a further example, the auto-adjustment feature may be enabled only for a certain amount of time after the target value is received in step 802. In some embodiments, step 806 is optional and the auto-adjustment feature is always enabled.

If the determination in step 806 indicates that auto-adjustment of the target value is disabled, process 800 may return to step 802. In such a case, the pilot or other user of the radar system may enter a new target value at a later time. For example, a pilot may enter a parameter via a user interface device to deactivate the auto-adjustment feature. This allows the vertical profile view to be updated such that it does not track a particular area or point of the detected weather.

Process 800 is further shown to include automatically adjusting the target value (step 808). If the auto-adjust feature is determined to be enabled in step 806 or if step 806 is omitted, the target value is adjusted to account for the motion of the aircraft and/or the motion of the weather. The processing electronics that receive the target value in step 802 may also receive data indicative of the motion of the aircraft, weather, or both. This data may be used by the processing electronics to adjust the target value, to focus the vertical profile view at a particular area or location of weather.

In some embodiments, the target value may be adjusted based on the motion of the aircraft. For example, the target value may be an azimuth angle relative to the heading of the aircraft. In such a case, the azimuth angle may be adjusted by associating a location relative to the ground (e.g., a latitude and longitude, a coordinate, etc.) to that of the detected weather. The associated location can then be used with the heading and relative range and bearing of the aircraft to adjust the target value.

In other embodiments, the adjustment of the target value may be made based on the motion of the weather. For example, the centroid or outline of the detected weather may be tracked by the weather radar detection system. This information may be used by processing electronics to determine the motion, range, and other characteristics of the detected weather. In further embodiments, a combination of both the aircraft motion data and the weather motion data may also be used to adjust the target value.

Process 800 is additionally shown to include updating the vertical profile view using the adjusted target value (step 810). In some embodiments, the adjusted target value may be used by the processing electronics to control the direction at which a future radar sweep is made. In other embodiments, the adjusted target value may be used by the processing electronics to select radar return data that corresponds to the adjusted target value. The vertical profile view may be updated by the processing electronics by generating a new vertical profile view or by updating a portion of the currently displayed vertical profile view. In some embodiments, the processing electronics may generate two or more vertical profile views (e.g., a view based on the adjusted target value, a view that is not based on the adjusted target value, etc.).

As shown, step 810 may return to step 806 in process 800. In this way, the target value, and its corresponding vertical profile view, may be continually updated based on the motion of the aircraft and/or the weather. If step 806 is omitted from process 800, step 808 may be performed after step 810 to continue adjusting the target value. In such a case, the auto-adjustment of the target value may end after one or more other conditions are met (e.g., an elapse of time, the receipt of a new target value from a user interface device, a parameter that disables the auto-adjustment feature, an airplane condition, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of displaying radar return data in a weather radar system of an aircraft, the method comprising:
    determining, via processing electronics, a target direction within a first display view, wherein the target direction intersects a first representation of a detected weather cell in the first display view;
    providing a vertical profile view including a second representation of the detected weather cell at a first time based on the target direction;
    determining, via the processing electronics, the motion of the aircraft between a first time and a later second time;
    calculating, via the processing electronics, an adjusted target direction based on the motion of the aircraft between the first time and the later second time for use in updating the vertical profile view, the adjusted target direction configured to keep at least a portion of the second representation of the detected weather cell within the vertical profile view at the later second time; and
    providing an image on an electronic display based at least in part on the radar return data, the image including the first representation of the detected weather cell in the first display view.

2. The method of claim 1, wherein the target direction is a location or direction selected from a plan view of the detected weather cell.

3. The method of claim 2, wherein the target direction is a selection of an azimuth angle received from a user interface device.

4. The method of claim 1, wherein the adjusted target direction is calculated using the location of the detected weather cell, the location of the aircraft, and the heading of the aircraft.

5. The method of claim 1, wherein the adjusted target direction further accounts for the motion of the detected weather cell.

6. The method of claim 5, wherein the motion of the detected weather cell is determined by tracking a centroid of the weather cell.

7. The method of claim 1, further comprising:
    providing, via the processing electronics, the vertical profile view to the electronic display.

8. The method of claim 1, further comprising:
    receiving, via the processing electronics, a parameter from a user interface device; and
    performing, via the processing electronics, the step of calculating the adjusted target direction based on the value of the parameter.

9. The method of claim 1, further comprising determining, via the processing electronic, whether an auto-adjustment feature is engaged, wherein the determining, calculating, and generating steps are repeated when the auto-adjustment feature is engaged.

10. A weather radar system for an aircraft, comprising:
    a user interface device; and
    processing electronics configured to determine a target direction within a first display view based on input from the user interface, wherein the target direction intersects a detected weather cell in the first display view, the processing electronics being configured to generate a vertical profile view including the detected weather cell at a first time based on the target direction, the processing electronics being further configured to determine the motion of the aircraft between a first time and a later second time and to calculate an adjusted target direction based on the motion of the aircraft between the first time and the later second time for use in updating the vertical profile view, the adjusted target direction configured to keep at least a portion of the detected weather cell within the vertical profile view at the later second time.

11. The system of claim 10, wherein the target direction is a location or direction selected from a plan view of the detected weather cell displayed on the user interface device.

12. The system of claim 11, wherein the target direction is a selection of an azimuth angle relative to a heading of the aircraft.

13. The system of claim 10, wherein the processing electronics are configured to calculate the adjusted target direction using the location of the detected weather cell, the location of the aircraft, and the heading of the aircraft.

14. The system of claim 10, wherein the adjusted target direction further accounts for the motion of the detected weather cell.

15. The system of claim 14, wherein the processing electronics are further configured to determine the motion of the detected weather cell by tracking a centroid of the weather.

16. The system of claim 10, wherein the user interface device comprises an electronic display, and the processing electronics are further configured to generate a vertical profile view of the detected weather cell based on the adjusted target direction and to provide the generated vertical profile view to the electronic display.

17. The system of claim 10, wherein the processing electronics are further configured to utilize a parameter to determine whether or not to calculate the adjusted target direction.

18. One or more non-transitory computer-readable media having instructions stored therein, the instructions being executable by one or more processors to execute a method comprising:
    determining a target direction within a first display view based on input from a user interface, wherein the target direction intersects a detected weather cell in the first display view;
    generating a vertical profile view including the detected weather cell at a first time based on the target direction;
    determining the motion of the detected weather cell relative to an aircraft between a first time and a later second time;
    calculating an adjusted target based on the motion of the detected weather cell relative to the aircraft between the first time and the later second time;
    generating a vertical profile view based on the adjusted target direction, the adjusted target direction configured to keep at least a portion of the detected weather cell within the vertical profile view at the later second time; and providing the generated vertical profile view to an electronic display.

19. The one or more non-transitory computer-readable media of claim 18, wherein the method further comprises determining the motion of the detected weather cell relative to the aircraft by tracking a centroid of the detected weather cell.

20. The one or more non-transitory computer-readable media of claim 19, wherein the adjusted target direction is calculated using the location of the detected weather cell, the location of the aircraft, and the heading of the aircraft.

* * * * *